Feb. 3, 1959 R. T. WEILLS 2,871,790
BUOY MOTOR

Filed Nov. 21, 1955 2 Sheets-Sheet 1

INVENTOR.
Raymond T. Weills.
BY
ATTORNEYS.

Feb. 3, 1959
R. T. WEILLS
2,871,790
BUOY MOTOR
Filed Nov. 21, 1955
2 Sheets-Sheet 2
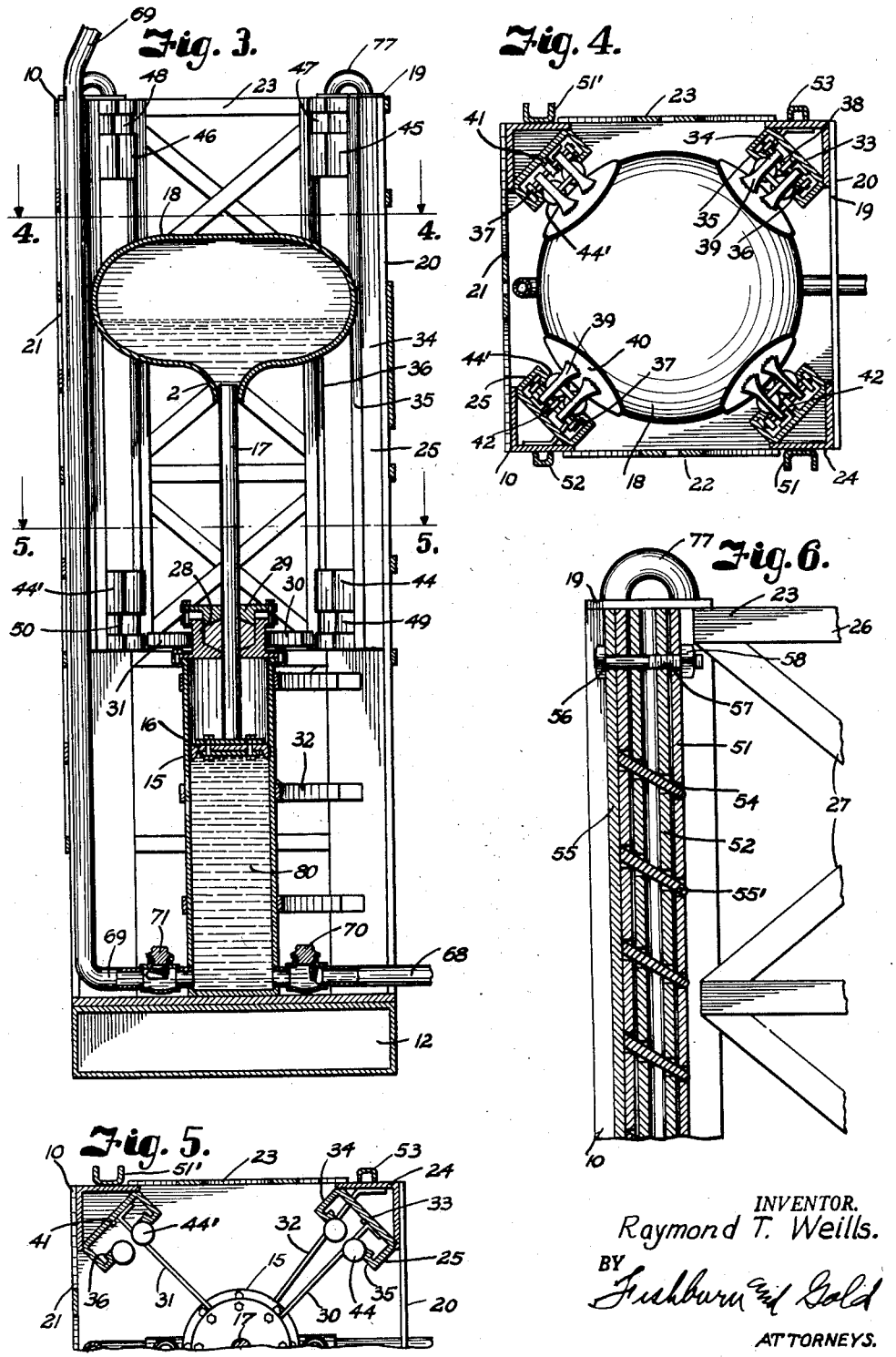
INVENTOR.
Raymond T. Weills.
BY
Fishburn and Gold
ATTORNEYS.

United States Patent Office 2,871,790
Patented Feb. 3, 1959

2,871,790

BUOY MOTOR

Raymond T. Weills, Amarillo, Tex.

Application November 21, 1955, Serial No. 548,047

2 Claims. (Cl. 103—70)

This invention relates to buoy motors and more particularly to a plurality of such motors attached to a support and operated by the waves of a body of water for generating power for suitable purposes.

Heretofore various wave motors have been devised to operate power shafts through various gear mechanisms but such devices have proven ineffective for the purposes for which they were designed.

Applicant's invention has been devised to produce a plurality of motors supported on a vessel or the like operable by the waves from the ocean or other body of water which will be efficient in operation and inexpensive in construction and operation.

The principal objects of the present invention are to provide mounting for a plurality of motors upon a base that is stationary along the body of water or to an actual ship anchored in the water where the force of the waves will be effective to operate the motors; to provide a plurality of such motors operable simultaneously or consecutively and controlled by the waves; to provide a mounting for the motors outwardly from the support a sufficient distance to allow full force of the waves against the motors; to provide means for fastening the units of the respective motors in alignment on the side of the support; to provide a container in the support for housing the fluid pumped by the respective motors; to provide means connected to the tank and the cylinders of the motors for permitting flow of water to and from the tank; to provide guide means in the unit for guiding the buoys upwardly and downwardly in the units as the waves move them upwardly and allow them to fall; to provide bumper means in said unit for the buoys; to provide the cylinders of sufficient length to allow for the full height of the waves and for the high and low tides at different seasons of the year; to provide conduits for carrying the water from the cylinders to the water tank in the supports; to provide a water falls operable on a turbine connected to a generator for generating the power through operation of the motors; and to provide means for securing one unit to the other in a way to permit the unit to be disconnected and taken out of line for inspection and repair.

In accomplishing these and other objects of the invention, I have provided improved details of structure, the preferred forms of which are illustrated in the accompanying drawings, wherein:

Fig. 3 is an enlarged vertical cross sectional view illustrating one of the buoy motors and unit.

Fig. 4 is a cross sectional view taken on the line 4—4, Fig. 3.

Fig. 5 is a cross sectional view taken on the line 5—5, Fig. 3.

Fig. 6 is an enlarged cross sectional view taken on the line 6—6, Fig. 1, particularly illustrating the connection of the units one to the other.

Figure 1:
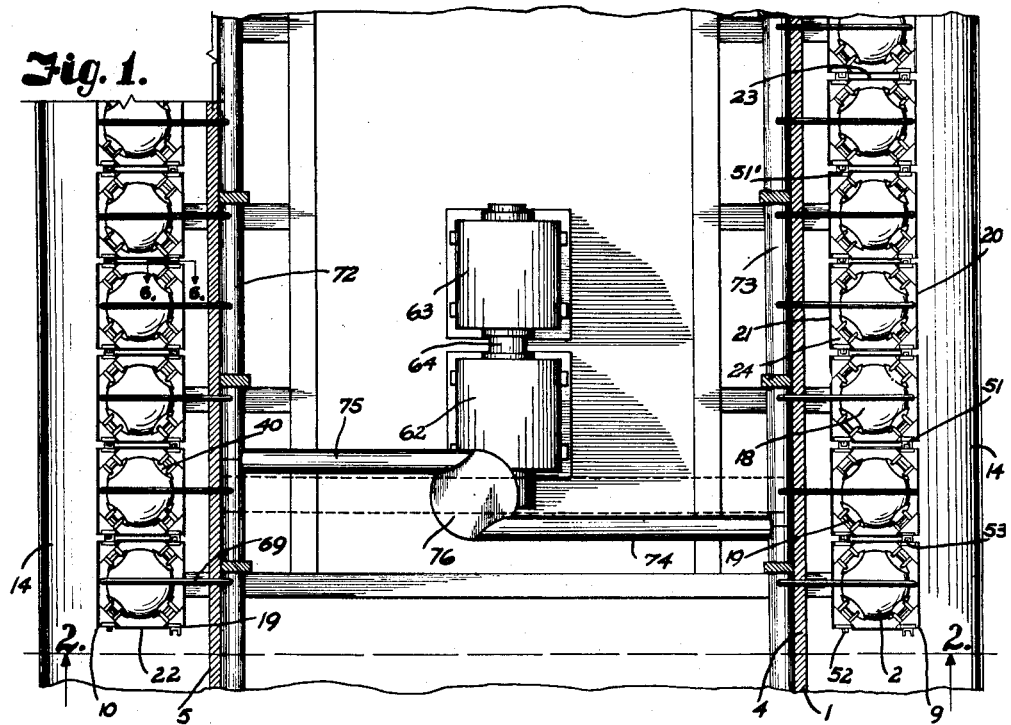
Fig. 1 is a top plan view illustrating the buoy motors and a part of the support and the connection to the turbine and generator, taken on a line 1—1, Fig. 2.

Referring more in detail to the drawings:

1 designates a barge, ship or the like to which my buoy motors 2 can be attached. While I do not wish to be limited to any particular support, I have shown the present assembly attached to a barge, although the buoy motors may be attached to a pier or breakwater along the shoreline of a body of water 3.

The barge has side walls 4 and 5 and a bottom 6. Extending transversely through the hull of the barge are beams 7 and 8, one placed above the other for support of the framework 9 and 10 for the buoy units, which will later be described. As many of the units as desired may be utilized for my purpose. Each unit has a substantially open compartment which houses a buoy motor 2. I have here illustrated the motor secured to each side of the barge or boat. As many beams as necessary may be utilized and placed horizontally along the boat for the securing of the units to the boat.

Figure 2:
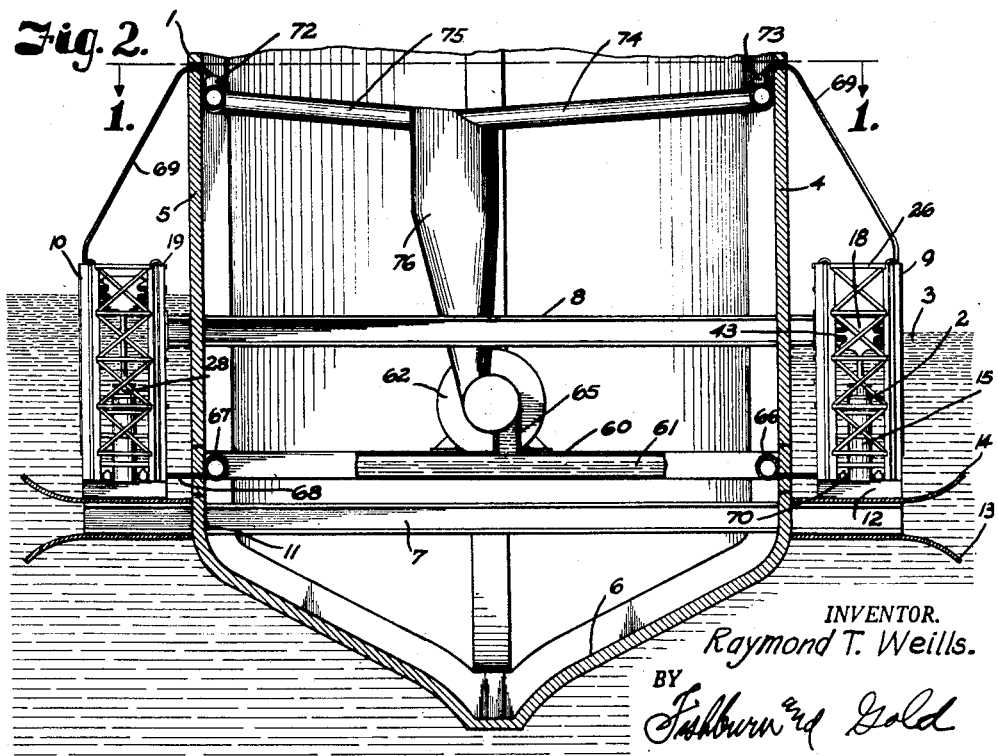
Fig. 2 is a vertical cross sectional view taken on line 2—2, Fig. 1.

The beams 7 and 8 extend through the side of the boat, as indicated at 11 (Fig. 2), and extend outwardly away from the boat as far as necessary for the waves to have a full sweep against the buoy motor. The upper part of the unit is held by the beam 8 and the lower part by the beam 7. The unit rests on such lower beam, also as best illustrated in Fig. 2. Air chambers 12 are provided beneath the unit of sufficient size to support the weight of the unit.

In order to steady the motion of the boat, I secure to the lower, outwardly extending ends of the beams 7 flares consisting of two pieces of curved material 13 and 14, such as metal or the like, one of the pieces being curved downwardly and the other upwardly, also as illustrated in Fig. 2.

Each buoy motor comprises a cylinder 15 having a weighted piston 16 slidable therein attached to a rod 17 to the upper end of which is attached a buoy or bulb member 18, slidable in a framework 19 comprising the unit of each buoy motor. The framework has sides 20 and 21 and ends 22 and 23 having angle-shaped corners 24 for strengthening the framework and also to which are attached guides 25 for the buoy 18. The guides extend substantially mid-way or a little below the center of the unit, as best illustrated in Fig. 3. The units are provided on their sides 20 and 21 with cross braces 26 and angle cross braces 27 to provide a structure sufficiently rugged to withstand the shock of the waves, but still open enough to allow the waves to exert their full force on the buoy.

The cylinder 15 has a head 28 and packing 29 for the piston rod. Connected to the head 28 are braces 30 and 31 and spaced braces 32 which are provided for engaging the cylinder 15 and which have their ends attached to the framework 19 of the unit to form a rigid structure.

The guides 25 are situated in each corner of the units and have straight sides 33 and ends 34 turned laterally, as at 35, and inwardly, as at 36, the free edges providing trackways for rollers or slide wheels 37 mounted on a shaft 38 secured to a pair of arms 39 having their outer ends secured by welding or other suitable means to plates 40 which are rigidly secured to the upper face of the buoy or bulb 18 and conform to the shape thereof. The sides 33 have inwardly extending trackways 41 for a slide roller 42 also mounted on the shaft 38. The wheels are grooved so as to run on the trackways 36 and 41, respectively. Like plates (not shown) engage the underneath faces of the buoys having the sliding roller arrangement with the guides as just above described. Stops or bumpers 44 and 44′ are provided at the lower end of the guides and stops 45 and 46 are provided at the upper end of the guides for limiting movement of the buoys in the framework structure. It will be obvious the guides control the movement of the buoy and form a framework to hold the entire unit in place. Shock absorbers 47 and 48 are provided at the top of the structure and shock absorbers 49 and 50 at the bottom of the guides against which the stops strike and limit movement of the buoys.

The vertical units are placed alongside each other, as best illustrated in Fig. 1, and are secured together in such a manner that they may be disconnected and taken out of line for repairs when necessary. The ends 22 and 23 are each provided with U-shaped members 51 and 51′ with the open U toward the outside. The ends are also provided with U-shaped members 52 and 53 with the U faced inwardly or the fork secured to the angle-shaped member 24. These U-shaped members are of a length substantially equal to the guides and the next adjacent framework are provided with like U-shaped members, the open U-shaped members 51 and 51′ fitting over the U-shaped members 52 and 53, as best illustrated in Fig. 6. The U-shaped or channel members are welded to the framework structure, one channel being smaller than the other which is welded to the end, as previously stated.

It will be noted the ends which carry the U-shaped members do not have the braces and are designated the "fastening" sides, when they are placed in position one inside of the other. The sides of the U-shaped members are provided with a plurality of spaced openings 54 adapted to receive metal tie-in bars 55 having prongs 55′ which extend to the face of the U-shaped member, as illustrated in Fig. 6. The prongs are angled downwardly and are of a length to fill the opening in the member. The bars are then fastened together by bolts 56 extending through openings 57 in the bars and the nuts 58 being welded thereto to the side of the bar, as best illustrated in Fig. 6. I do not wish to be limited to any number of the tie bars as as many may be used as is necessary to accomplish the purpose of making a rigid structure.

The U-shaped channel members 51 and 51′, and 52 and 53 are of substantially the length as the guides 25. To facilitate fastening of the unit together, rests (not shown) may be employed which consist of a half circle shaped to fit the tie-in bar loosely and rest on a level so that when the bar is in place, each prong is in a position to go into the holes 54 so that when the bar is moved off the rest, all of the prongs drop into place and the bar is then bolted to the edge of the framework structure.

A reservoir or tank 60 is provided in the support or boat 1 for containing a liquid such as water 61 suitable for being raised by the motor and pumps to propel the water through its lines to a turbine or the like.

62 designates a water turbine and 63 a generator connected by power driving mechanism, as indicated at 64 (Fig. 1). Housed within the turbine are vanes (not shown), as is the usual practice. The tank 60 is connected to the water turbine by a tube line 65. Lines 66 and 67 connect with either side of the tank and extend horizontally therealong and are connected by conduit 68 and to the lower end of the cylinders 15. Check valve 70 is inserted in the conduits 68 and 69 near the cylinder, as best illustrated in Fig. 3. The conduits 69 extend vertically of the frame of the unit to connect with horizontally extending conduits 72 and 73, and have check valves 71 therein near the cylinder 15. The check valves 70 and 71 open and close oppositely relative to each other for a purpose later described. The horizontal or lateral conduits 72 and 73 are of sufficient diameter to carry all the fluid flowing from the vertical conduits. There are as many vertical conduits as there are buoy motors. The turbine and generator are placed in substantially the center of the support 1 and conduits 74 and 75 lead from the lateral conduits 72 and 73 to a downfall 76 which connects with the turbine 62.

The vertical conduit 69 must be of diameter determined by the height to which water is carried and the lateral conduits 72 and 73 of sufficient size to carry the water flowing into them from all of the vertical lines and to flow by gravity through lines 74 and 75. The dropdown or waterfall is sufficiently large to carry all water from the lateral conduits. The size of the tank 60 is determined by the number of units and will be large enough with a slight allowance to spare to handle the water from all units.

Operation of the apparatus constructed and assembled as described is as follows:

When the waves contact the buoys 2 and particularly the bulb portion 18, the piston will be raised in the cylinder 15 to fill the cylinder with water, as indicated at 80, from the tank 60 through line 68 and valve 70. When the waves recede the weight of the plunger in the cylinder will cause the plunger to move downwardly closing the check valve 70 and opening valve 71 forcing the water through line 69 up the vertical line to the lateral conduits 72 and 73 then through the lines 74 and 75 to the downfall spout 76 to the turbine 62 which will operate the power mechanism 64 to the generator 63 to complete the cycle for distribution of power therefrom. When the plunger recedes as far as the waves allow, the next wave will again raise the plunger or piston to again pull the water from the tank 60, as above set forth, resulting in a continuous operation of the buoys.

In order to lift the individual units out of place and replace them, I provide hook members 77 rigidly secured to the top of the framework 19.

It will be obvious that the buoys may work simultaneously or some of them simultaneously and some of them consecutively, depending upon the force of the waves and frequency thereof. This will also depend on how the boat or support is stationed in connection with the waves. If the waves hit the support broadside at one time, all of the buoys might be lifted simultaneously.

It will be obvious from the foregoing that the buoy motor or bulb 18 will move upwardly and downwardly in the guides 25 and the stops will prevent damage caused by unusual drop in the structure on the water due to receding of the waves. It will further be obvious that the individual units may be dismantled from the succession of units for inspection and repair without tearing down the complete set of units.

It will be further obvious that I have provided an improved buoy motor operable by the waves of a body of water in such a manner to produce power not heretofore known or described.

What I desire to claim and secure by Letters Patent is:

1. An apparatus adapted to be positioned in a relatively fixed position in a mass of water subject to variation of level and for supplying hydraulic power and comprising, a plurality of vertically elongate frames fixed relative to the water level, each said frame including opposed side members and opposed end members defining a substantially open compartment therebetween, an elongate outwardly opening U-shaped member and an elongate inwardly opening U-shaped member extending longitudinally on the outer surface of each said end member in spaced apart relation, said U-shaped members on one end of one frame being adapted to fit in mated relationship with the respective U-shaped members on the other end of a second frame when said frames are placed in end to end relation, said U-shaped members having a plurality of vertically spaced apertures aligned transversely thereof, an elongate bar having a plurality of outwardly extending prongs spaced longitudinally apart for engaging in said apertures and selectively releasably holding the frames in fixed end to end relationship, track means extending longitudinally in one end of the compartment in each said frame and defining pairs of opposed trackways secured on the inner surfaces of said side and end members, a bulb member within said one end of the compartment and adapted to float on the surface of the water, means secured on said bulb member slidably engaging in said trackways whereby the bulb member moves up and down in fixed relation to the track means, pumping means mounted in the other end of said compartment adjacent the respective ends of the trackways, means operably connecting the bulb member to said pumping means whereby up and down movement of said bulb member activates the pumping means, conduits communicating with said pumping means for selectively supplying same with water and carrying away the flow therefrom under pressure, resilient means secured at the respective ends of said trackways, and stop means in said trackways in abutting relation with said resilient means for yieldingly restricting the movement of the bulb member at the respective ends of the track means.

2. An apparatus adapted to be positioned in a relatively fixed position in a mass of water subject to variation of level and for supplying hydraulic power and comprising, a plurality of vertically elongate frames fixed relative to the water level, each said frame having opposed side members terminating in laterally turned flanges extending toward the respective opposite side member, end members secured on said flanges in spaced relation to said side members to define a substantially open compartment, an elongate outwardly opening U-shaped member and an elongate inwardly opening U-shaped member respectively on the outer surface of opposed flanges adjacent a respective side member, said U-shaped members extending longitudinally on the respective frames and the U-shaped members on one end of one frame being adapted to fit in mated relationship with the U-shaped members on the other end of a second frame when said frames are placed in end to end relation, said U-shaped members having a plurality of vertically spaced apertures aligned transversely thereof, an elongate bar having a plurality of outwardly extending prongs spaced longitudinally apart for engaging in said apertures and selectively releasably holding the frames in fixed end to end relationship, track means extending longitudinally in one end of the compartment in each said frame and defining pairs of opposed trackways secured on the inner surfaces of said side and end members, a bulb member within said one end of the compartment and adapted to float on the surface of the water, means secured on said bulb member slidably engaging in said trackways whereby the bulb member moves up and down in fixed relation to the track means, pumping means including a cylinder and piston therein mounted in the other end of the compartment adjacent the respective end of the trackways, means operably connecting the bulb member to said piston whereby up and down movement of said bulb member activates the pumping means, conduits communicating with said pumping means relative to said piston for selectively supplying same with water and carrying away the flow therefrom under pressure, resilient means secured at the respective ends of said trackways, and stop means in said trackways in abutting relation with said resilient means for yieldingly restricting the movement of the bulb member at the respective ends of the track means.

References Cited in the file of this patent
UNITED STATES PATENTS

| | | |
|---|---|---|
| 435,034 | Eloheimo | Aug. 26, 1890 |
| 646,199 | Walker | Mar. 27, 1900 |
| 706,620 | Williams | Aug. 12, 1902 |
| 901,117 | McManus | Oct. 13, 1908 |
| 950,460 | Skirtun | Feb. 22, 1910 |
| 1,105,249 | Bustos | July 28, 1914 |

FOREIGN PATENTS

| | | |
|---|---|---|
| 566,691 | Great Britain | Jan. 10, 1945 |